(12) United States Patent
Schibilla et al.

(10) Patent No.: US 6,279,089 B1
(45) Date of Patent: Aug. 21, 2001

(54) DEFECTIVE DATA SITE MANAGEMENT THROUGH A SHARED DEFECT MANAGEMENT TABLE

(75) Inventors: Mark R. Schibilla; Timothy W. Swatosh, both of Rochester, MN (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 09/290,457

(22) Filed: Apr. 12, 1999

(51) Int. Cl.[7] .................................................. G11B 7/00
(52) U.S. Cl. ........................... 711/162; 711/161; 711/111; 711/112; 711/114; 714/1; 714/6; 714/7; 714/8; 714/25; 714/30; 714/36; 714/40; 714/41; 714/42; 714/710; 714/718
(58) Field of Search .................................. 711/4, 111–114, 711/161, 162, 165, 170–173; 714/1, 6, 7, 8, 25, 30, 36, 40–42, 44, 710, 711, 718–720

(56) References Cited

U.S. PATENT DOCUMENTS

| | | | |
|---|---|---|---|
| 5,111,444 | * 5/1992 | Fukushima et al. | 369/58 |
| 5,235,585 | 8/1993 | Bish et al. | 369/54 |
| 5,271,018 | 12/1993 | Chan | 714/70 |
| 5,844,911 | * 12/1998 | Schadegg et al. | 714/710 |
| 5,974,544 | * 10/1999 | Jeffries et al. | 713/1 |
| 6,025,966 | * 2/2000 | Nemazie et al. | 360/53 |
| 6,034,831 | * 3/2000 | Dobbek et al. | 360/53 |
| 6,134,214 | * 10/2000 | Takagi et al. | 369/275.3 |

* cited by examiner

Primary Examiner—Than Nguyen
(74) Attorney, Agent, or Firm—Milad G Shara

(57) ABSTRACT

A method of managing defective data sites on a hard disk drive through a shared defect table. The method writes both skip type entries and vector type entries to the defect table. Skip type entries represent defective data sites that are to be skipped during operation of the disk drive, and vector type entries represent defective data sites which have been reassigned to spare data sites and alternate locations on the disk. Both skip type entries and vector type entries are in a common format within the defect table, where the top two data bits of each entry distinguish skip type entries from vector type entries. The method also manages a separate cross-reference table for vector type entries, where the location of the reassigned defective data site is associated with the location of a spare data site which contains the data from the reassigned site. The shared defect table provides an efficient way for distinguishing skipped and vectored defective data sites during subsequent disk operation.

13 Claims, 4 Drawing Sheets

DEFECTIVE DATA SITE MANAGEMENT THROUGH A SHARED DEFECT MANAGEMENT TABLE

BACKGROUND OF THE INVENTION

1. Field of the Invention

The present invention relates to hard disk drives. More particularly, the present invention relates to a method for managing defective data sites encountered during operation of the disk drive through a single defect management table.

2. Description of the Related Art

Hard disk drives store large volumes of data on one or more disks mounted on a spindle assembly. Disk drives employ a disk control system for interfacing with a host (e.g., a computer) to control the reading and writing of data on a disk. Each disk includes at least one disk surface which is capable of storing data. On each disk surface, user data is stored in data sectors (i.e., data sites) organized in concentric circular tracks between an outside diameter and an inside diameter of the disk.

As a result of the manufacturing process, defective data sites may exist on the disk surfaces of the disk drive. These defective data sites are conventionally termed "primary" defects. A defect discovery procedure is performed to locate these defects and mark them out as defective locations on the disk surface which are not available for use. A typical defect discovery procedure includes writing a known data pattern to the disk surface and subsequently reading the data pattern from the disk surface. Defective data sites are identified by comparing the data pattern read from the disk surface with the known data pattern written to the disk surface.

Following the defect discovery procedure, defective data sites are written to a primary defect list (PLIST). The primary defect list is used during formatting of the disk surface to generate a primary defect management table. Once identified in the primary defect management table, the defective data site may not be used for storing data and are passed over or "skipped" during disk drive operations.

Defective data sites encountered after formatting the disk surface are known as "grown defects" or "secondary defects". Grown defects often occur in locations adjacent to defective data sites found during defect discovery. Grown defects are also written to a list, known as the grown defect list (GLIST), similar to that utilized for the primary defects. Grown defects encountered during the operation of the disk drive are added to a secondary defect management table. The secondary defect management table is utilized along with the primary defect management table during the operation of the disk drive for the identification of defective data sites on the disk surface. The defective data sites residing within the secondary defect management table are reassigned or "vectored" (i.e., mapped via an index pointer) to spare data site locations via a cross-reference entry (cylinder number, head number, and data sector number).

Thus, in prior art reassignment schemes, separate defect management tables are maintained for skipped data sites and reassigned data sites. The primary defect management table typically contains a list of data site addresses to be avoided during operation. In contrast, the secondary defect management table typically contains multiple cross-reference entries of data site reassignments, where each entry contains a defective data site address and a corresponding spare data site address which contains the reassigned data from the defective data site address. Due to limited bandwidth and operational memory, it is desirable to minimize the use and complexity of defect management tables which are active during read/write operations. The maintenance and use of two separate defect management tables during the operation of the disk drive results in operational inefficiencies.

There is a continuing need therefore for a defect management scheme which minimizes the operational inefficiencies while dealing effectively with defective data sites which are discovered during disk operations.

SUMMARY OF THE INVENTION

The present invention provides, in a disk drive driving having data sites on a disk, a method for accessing a series of logical data blocks which are mapped to sequential and non-sequential data sites to form a series of mapped data sites. The mapped data sites include a sequential string of data sites and a non-sequential data site, where the sequential string of data sites is terminated by a defective data site. The method begins by providing a defect table including entries for referencing defective data sites. The method next defines a skip type entry for the defect table, wherein the skip type entry includes a reference to a defective data site which is skipped. The method then defines a vector type entry for the defect table, where the vector type entry includes a reference to a defective data site which is reassigned to a secondary data site. Next, the method makes a skip type entry in the defect table to reference a skipped defective data site. The method then makes a vector type entry in the defect table to reference a skipped defective data site. Finally, the method accesses the series of mapped data sites using the defect table.

In one embodiment of the present invention, the method step of making a vector type entry in the defect table to indicate a reassigned defective data site includes two additional steps. In the first additional step, a vector cross reference entry for a reassignment cross-reference table associated with the defect table is defined. The vector cross-reference entry includes a reference to the defective data site which is reassigned and a corresponding reference to a reassignment data site. In the second additional step, a vector cross-reference entry is made in the reassignment cross-reference table to cross-reference the defective data site with the corresponding reassignment data site.

The defect table utilized by the present invention includes both primary defects and grown defects, which are represented by skip type entries and vector type entries, respectively. Both the skip type entries and vector type entries share a common field format. Each entry in the defect table comprises an entry type field and a location field. The location field of the defect table comprises an offset from an origin of a defect management partition.

The reassignment data site for a vector type entry is chosen from one or more spare data sites located on the disk. The one or more spare data sites are grouped into a pool of spare data sites, where a single pool of spare data sites exists on each disk. In one embodiment of the present invention, the pool of spare data sites contains approximately 1000 spare data sites. A spare pointer points to the next available spare data site within the pool of spare data sites. The spare pointer is incremented to point to the next available spare data site upon reassignment of the defective data site to a corresponding reassignment data site in the pool of spare data sites. In one embodiment of the present invention, the method is implemented in firmware residing within a disk control system of the disk drive.

BRIEF DESCRIPTION OF THE DRAWINGS

The accompanying drawings are included to provide a further understanding of the present invention and are incorporated in and constitute a part of this specification. The drawings illustrate embodiments of the present invention and together with the description serve to explain the principles of the invention. Within the drawings, like numbers designate like elements.

DETAILED DESCRIPTION

Figure 1:
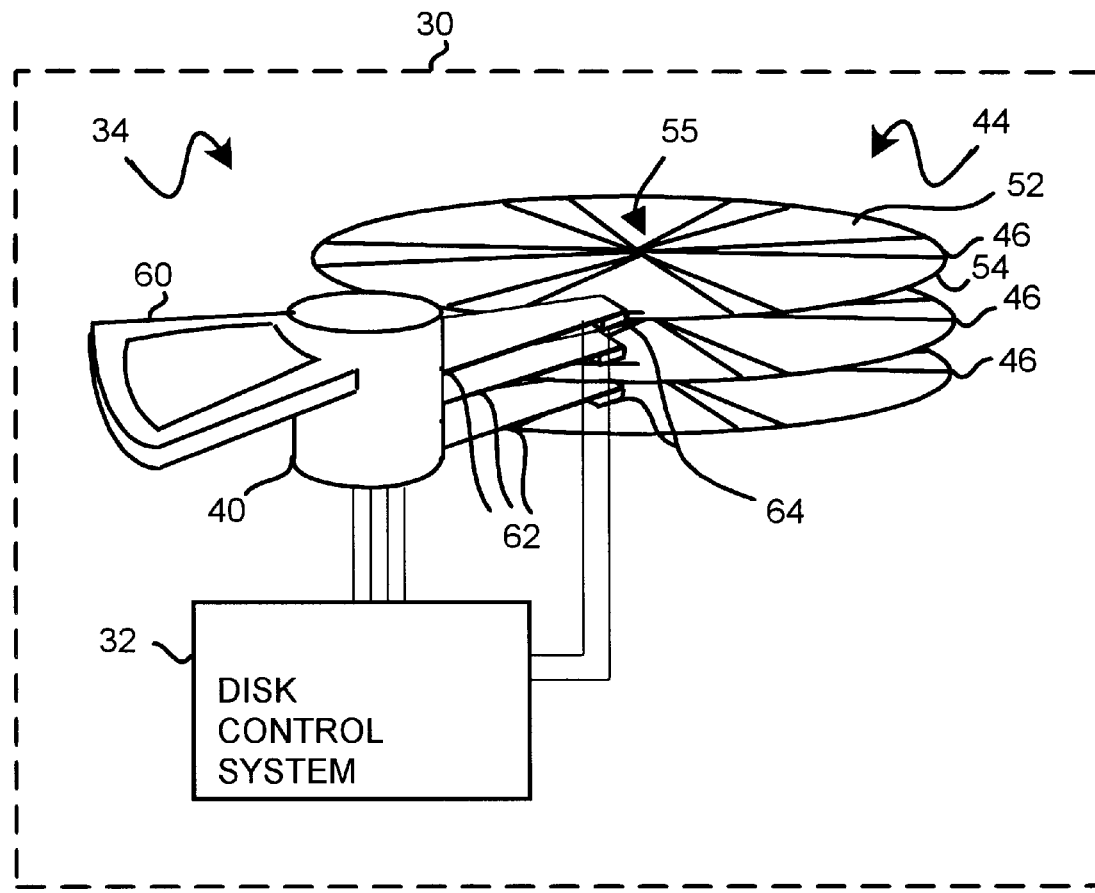
FIG. 1 is a block diagram illustrating a hard disk drive system in accordance with the present invention.

FIG. 1 is a block diagram illustrating a hard disk drive system in accordance with the present invention. Disk drive 30 includes a disk control system 32 (e.g., a controller) and a head disk assembly (HDA) 34. Disk control system 32 includes circuitry and processors which provide an intelligent disk control system interface between a host system (not shown) and HDA 34 for execution of read and write commands. The host system can include a microprocessor based data processing system such as a personal computer, or other system capable of performing a sequence of logical operations. Further, disk control system 32 includes an embedded servo system for controlling HDA 34. Disk control system 32 can be similar to other disk control systems known to those skilled in the art. Finally, disk control system 32 includes firmware for implementing the defective data site management method of the present invention.

HDA 34 includes a rotary actuator assembly 40 and a disk assembly 44. Disk assembly 44 includes one or more magnetic media disks, such as indicated at 46. Disks 46 are stacked on a spindle assembly (not shown) for rotating disks 46 at a high rate of speed. Each disk 46 preferably has two disk recording surfaces (i.e., disk surfaces) capable of storing data thereon, such as indicated at 52 and 54. Each disk surface has a plurality of repeating servo track patterns defining radially spaced-apart servo tracks, generally indicated at 55.

Rotary actuator assembly 40 includes a voice coil motor (VCM) 60 and multiple actuator arms 62 extending from VCM 60. Each actuator arm 62 corresponds to a respective disk, and may have one or two transducer heads 64 disposed at a distal end. Each transducer head 64 is associated with a corresponding disk surface 52, 54.

Figure 2:
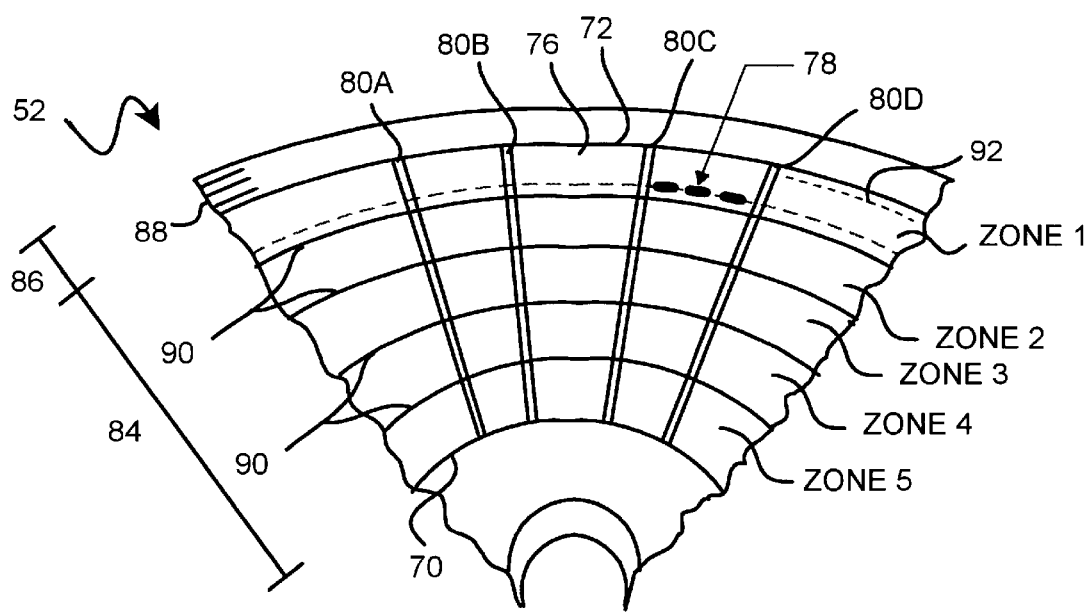
FIG. 2 is partial plan view of a disk surface having user data sites and a pool of spare reassignment data sites.

FIG. 2 is partial plan view of a disk surface having data sites, including at least one marginally defective data site, and a pool of spare reassignment data sites. Disk surface 52 includes an inner boundary 70 and an outer boundary 72. Data is stored on concentric, circular tracks, indicated by representative dashed line 76, between inner boundary 70 and outer boundary 72. Recorded information (i.e., user data) on the disk surface is divided into data regions or groups of data sectors 78 (i.e., data sites). Information for a servo system tracking the position of heads 64 is recorded in embedded servo sectors or servo "wedges" placed in radially continuous narrow regions between groups of data sectors 78, indicated at 80A, 80B, 80C and 80D. Servo information is contained in the servo sectors 80A, 80B, 80C and 80D in a number of fields. Typically, there are a plurality of data sectors 78 grouped between pairs of servo "wedges".

Disk surface 52 includes a user data band 84 (or user data area) and a reserved band 86 (or reserved area). User data band 84 includes a plurality of user data tracks on the disk surface 52. The reserved band 86 is located outside the user data band 84, and typically comprises a number of "reserved" data tracks (e.g. 1 to 20 data tracks), indicated at 88. The user data band on disk surface 52 is used for storing user data during operation of the disk drive 30. The reserved band of the disk surface is utilized for storing drive specific data or "optimization" data.

Using zone recording techniques, groups of adjacent data tracks are assigned to a plurality of zones between the inner boundary 70 and the outer boundary 72. In the illustrated embodiment, disk surface 52 has been partitioned into five physical zones, illustrated by partitions 90, labeled ZONE 1, ZONE 2, ZONE 3, ZONE 4, and ZONE 5. Disk surface 52 may be partitioned into any desirable usable number of zones, which more typically ranges between 10 and 16 zones. The establishment of zones allows for efficiency in recording by varying recording frequencies to maintain approximately constant linear bit density across the disk as is well known in the art.

In one embodiment of the present invention, disk surface 52 includes a spare pool 92 of contiguous data sites located at the outer diameter of a physical zone. Data sites within the spare pool 92 are utilized by the present invention when reassigning data from a defective data site. In a preferred embodiment, spare pool 92 contains 1000 contiguous data sites.

Figure 3:
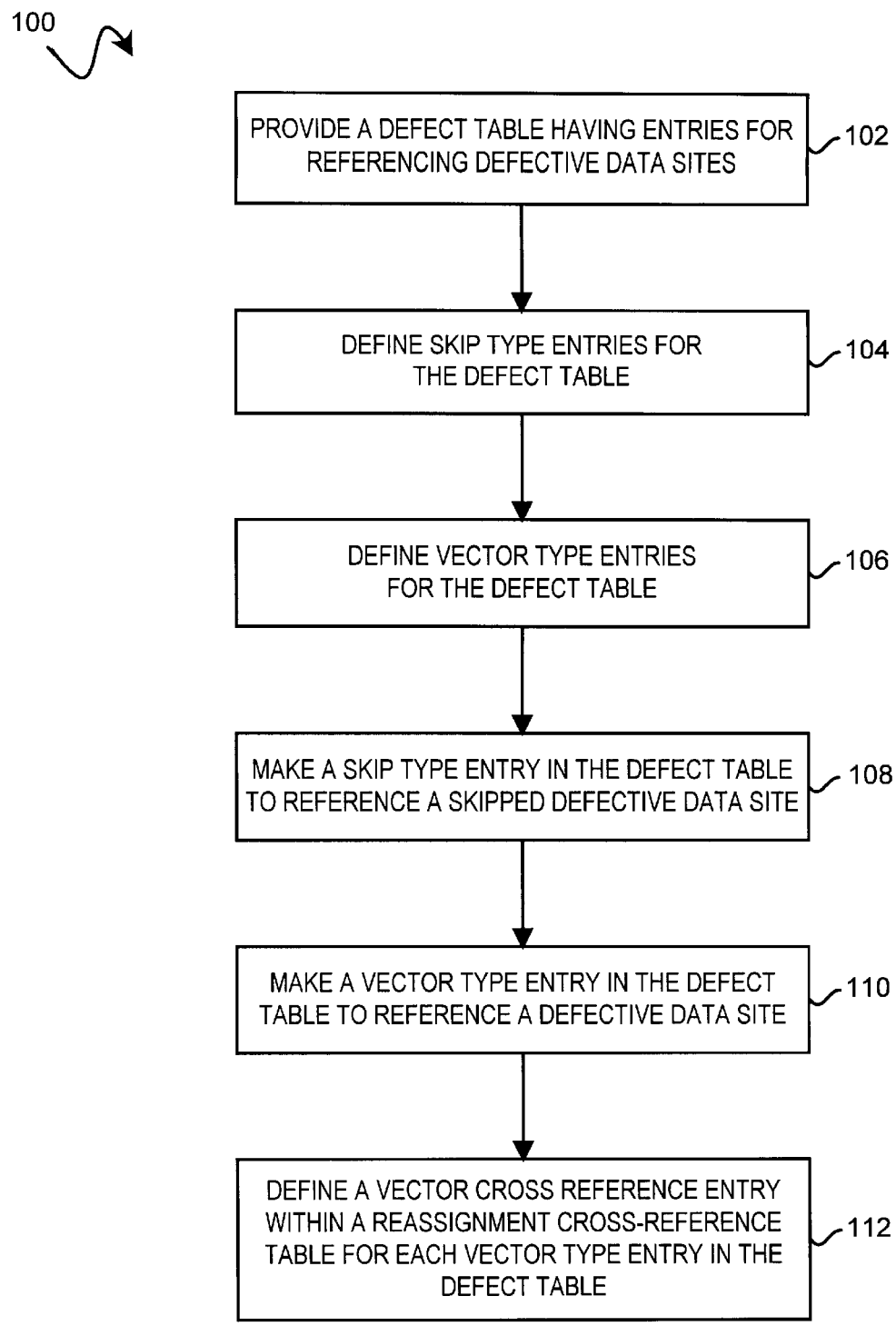
FIG. 3 is a flow chart illustrating a method of managing defective data sites on a hard disk drive through a common defect management table in accordance with the present invention.

FIG. 3 is a flow chart illustrating a method of managing defective data sites on a hard disk drive through a common defect management table in accordance with the present invention, indicated generally at 100. At block 102, the method begins by providing a defect table having entries for referencing defective data sites. The defect table is also known as the "push down list" (PDLIST). The defect table of the present invention accommodates entries for both defective data sites that are skipped and defective data sites which have been reassigned to alternative locations.

At block 104, the method next defines skip type entries for the defect table. Skip type entries typically result from primary disk defects discovered after the manufacturing process but before actual customer use of the disk drive. A skip type entry includes the location of a defective data site (represented as an offset from the origin of a defect management partition), and a defect type identifier indicating the type of site defect. In one embodiment of the present invention, each skip type entry is sixteen bits, with the lowest fourteen bits containing the location of the defective data site, and the upper two bits containing an identifier indicating the type of site defect.

Next, vector type entries for the defect table are defined, as indicated at block 106. Vector type entries typically result from grown defects discovered during host initiated operations on the disk drive. A data site is typically identified as a grown defect when the disk drive encounters problems reading data from the site (e.g., multiple read retries), but is still able to eventually read the data. A scoring algorithm analyzes the read performance of a data site, and if the data site score falls below a predefined performance threshold, the data site is identified as a grown defect. A vector type entry includes the location of the defective data site (represented as an offset from the origin of a defect management partition), and an entry indicator identifying the entry as a vector type entry. In one embodiment of the present invention, each vector type entry is sixteen bits, with the lowest fourteen bits containing the location of the defective data site, and the upper two bits containing the indicator identifying the entry as a vector type entry.

At block 108, the method makes a skip type entry in the defect table to reference a skipped defective data site. In this step, the location of the data site containing the defect is written to a primary defect list (PLIST) and also to the defect table as a skip type entry.

At block 110, the method makes a vector type entry in the defect table to reference a defective data site. In this method step, the location of the data site is written to a grown defect list (GLIST) and also to the defect table as a vector type entry.

Finally, at block 112, the method defines a vector cross reference entry within a reassignment cross-reference table for each vector type entry in the defect table. Data from the grown defect data site is then reassigned to an alternative data site located within a pool of spare data sites at a different location on the disk, and the grown defect data site address is vectored (e.g., mapped via a data pointer) to the alternative data site via an entry in a reassignment cross reference table. This operation is discussed in greater detail in the description of FIG. 4.

Figure 4:
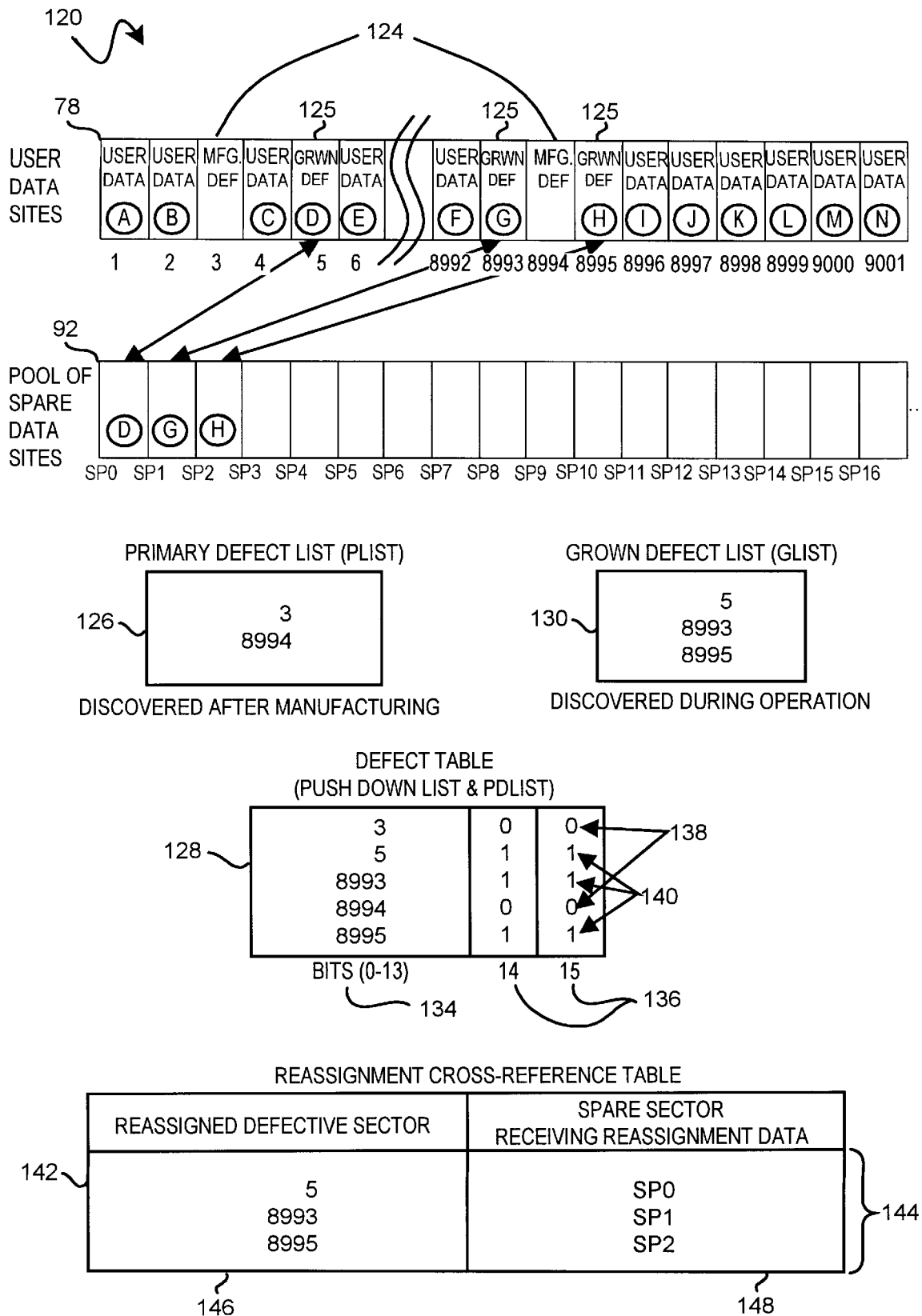
FIG. 4 illustrates an embodiment of the present invention, wherein skip type defect and vector type defect entries are managed through a shared defect management table.

FIG. 4 illustrates an embodiment of the present invention, wherein skip type and vector type defect entries are managed through a shared defect management table, illustrated generally at 120. As described above, the disk drive surface includes a plurality of data sites 78 which are used to store user data. After manufacturing, the disk drive surface is analyzed in order to identify data sites 78 which may be defective. In the illustrated embodiment, user data sites 78 located at physical sector addresses "3" and "8994" contain manufacturing defects (also known as primary defects), as shown at 124. These defective data sites 124 must be identified and recorded so that the data sites may be avoided during normal operation of the disk drive. As a result, the location addresses of these defective data sites 124 are recorded in a primary defect list (PLIST) 126 and also in an operational defect table 128.

Primary defect list 126 is used to archive the location addresses of defective data sites discovered after manufacturing so that users can retrieve the information at a later time. As an example, the number of data sites residing on primary defect list 126 provides to the user a generalized indication of the disk media quality. Operational defect table 128 is referenced during the operation of the drive by firmware within the disk control system to identify sites to avoid while performing data read and write operations. Entries in the primary defect list are stored in a cylinder/head/wedge/position/length format. This allows a single primary defect list defect entry to represent defects of varying lengths (e.g., multi-sector defects).

Each primary defect entry recorded within operational defect table 128 contains two fields: a location field 134 and an entry type field 136. The location field 134 has a sixteen bit format, where the address of the defect is recorded in bits (0–13), and the entry type field includes a two bit defect identifier recorded in bits 14 and 15, as shown at 136. Primary defect entries recorded within operational defect table 128 are typically skip type entries, wherein each skip type entry represents a single sector location on the disk surface. Thus, when operational defect table 128 is generated at format time, multiple operational defect table entries may be generated for a given primary defect list entry, where the primary defect list entry represents a multi-sector defect. Each primary defect is indicated within operational defect table 128 as a skip type entry by recording the appropriate setting in the entry type field 136. The settings within the entry type field of the primary defect entry recorded within operational defect table 128 indicates that the address is to be skipped during the operation of the drive.

During operation of the disk drive, defects can develop in user data sites 78. Defects which develop during operation of the drive are known as grown defects. In the illustrated embodiment, data sites located at addresses "5", "8993", and "8995" are identified as grown defect data sites, as shown at 125. Firmware within the disk drive control system uses a scoring algorithm during normal read operations to determine when user data sites 78 are developing grown defects. The scoring algorithm looks at performance attributes such as the number of retries necessary to read information from a data site when determining whether a site is suffering a grown defect. Once the scoring algorithm determines that a data site 125 is becoming unusable as a result of a grown defect, the data site must be identified and recorded so that the site may be avoided during normal operation of the disk drive. As a result, the location addresses of data sites experiencing grown defects 125 are recorded in a grown defect list (GLIST) 130 and also in operational defect table 128.

Grown defect list 130 is used to archive the location addresses of defective data sites discovered during normal drive operations so that users can retrieve the information at a later time. As an example, the number of data sites residing on grown defect list 130 provides a generalized indication to the user of the health of the drive. Operational defect table 128 is referenced during the operation of the drive by firmware within the disk control system to identify grown defect sites which have been reassigned to alternate data sites on the disk surface. Grown defect list entries are represented within the grown defect list in a cylinder/head/wedge/position/length format, where each entry describes a defect of exactly one sector. In contrast to the skip type entries of primary defects, grown defect sites are typically not skipped, but are redirected to alternate data site locations on the disk, which contains the reassigned data of the data site experiencing the grown defect.

Each grown defect entry recorded within operational defect table 128 contains two fields: the location field 134 and the entry type field 136. The location field 134 has a sixteen bit format, wherein the address of the defect is recorded in bits (0–13), and the entry type field includes a defect identifier which is recorded in bits 14 and 15, as shown at 136. Grown defect entries recorded within operational defect table 128 are vector type entries. Grown defects are indicated as a vector type entry by recording the appropriate setting in the entry type field 136 of operational defect table 128. The settings of bits 14 and 15 of the grown defect entry recorded within operational defect table 128 indicate that the grown defect data site is to be vectored to an alternative data site during the operation of the drive. There is generally a one-to-one correspondence between entries in the grown defect list and grown defect entries recorded with operational defect table 128.

Data from a data site 125 identified as becoming unusable as a result of a grown defect is reassigned to a spare data site within a pool of spare data sites 92 located at a different area on the surface of the disk. As an example, when the data site at location address "5" within the group of user data sites is identified as becoming marginally defective (i.e., as having a grown defect), the data from the marginally defective data site is reassigned to the next available spare data site "SP0" within the pool of spare data sites 92. In a similar manner, the data from grown defect data sites 125 at locations 8993 and 8995 are written to spare data sites "SP1" and "SP2", respectively.

After the data from the grown defect data sites 125 has been reassigned to spare data site in spare pool 92, a vector cross reference entry 144 for the reassignment is defined. Defined vector cross-reference entries 144 are stored in a reassignment cross-reference table 142. Each vector cross-reference entry 144 includes a reference to the defective data site which is reassigned (shown at 146) along with a corresponding reference entry to the spare data site receiving the reassignment (shown at 148).

As a result of the defect discovery procedures described above, operational defect table 128 contains both skip type entries, as indicated at 138, and vector type entries, as indicated at 140. Skip type entries are distinguished from vector type entries by the bit settings in columns 14 and 15 of the operational defect table entry. In the illustrated embodiment, bit setting "00" in columns 14 and 15 indicate a skip type entry 138 (i.e., PLIST defect), while bit setting "11" in columns 14 and 15 indicates a vector type entry 140. Bit settings "01" and "10" (not illustrated in operational defect table) are used to represent two different types of track defects.

When the disk drive initiates a read or write operation which spans a data site containing a primary defect (i.e., manufacturing defect) 124 during normal operation, the drive firmware scans operational defect table 128, and finds a matching entry for the address of the data site containing the primary defect. Columns 14–15 of the matching entry indicate that the data site is to be skipped (i.e., the entry is a skip type entry), so the disk drive controller is set up to skip over the defective site. This can be accomplished by data pointer register settings which allow for automatic skip or by terminating an operation at the defect site and restarting at the next contiguous valid site.

When the disk drive operation spans a data site containing a grown defect 125 during normal operation, the firmware scans operational defect table 128, and finds a matching entry for the address of the data site containing the grown defect. Columns 14–15 of the matching entry indicate that the data site is a reassigned vectored data site (i.e., the entry is a vector type entry). Since the entry is a vector type entry, the reassignment cross-reference table 142 is next searched for an entry which matches the address of the reassigned defective data site. Once a matching entry has been found, the address of the associated data site receiving the reassigned data is retrieved. Preferably, the disk drive next seeks to the address of the associated data site receiving the reassigned data and the reassigned data is read. After the read operation has been completed, the disk drive seeks back to the address of the reassigned data site containing the grown defect, and the data pointer is incremented to the next user data site 78 to be read.

We claim:

1. In a disk drive having data sites on a disk, a method for accessing a series of logical data blocks which are mapped to sequential and non-sequential data sites to form a series of mapped data sites comprising a sequential string of data sites and a non-sequential data site and wherein the sequential string of data sites is terminated by a defective data site, the method comprising the steps of:

providing a defect table comprising entries for referencing defective data sites;

defining a skip type entry for the defect table, the skip type entry comprising a reference to a first defective data site which is skipped;

defining a vector type entry for the defect table, the vector type entry comprising a reference to a second defective data site which is reassigned to a secondary data site;

making a skip type entry in the defect table to reference the first defective data site;

making a vector type entry in the defect table to reference the second defective data site; and accessing the series of mapped data sites using the defect table.

2. The method of claim 1, wherein the step of making a vector type entry in the defect table to reference the second defective data site further comprises:

defining a vector cross-reference entry for a reassignment cross-reference table associated with the defect table, the vector cross-reference entry comprising:

a reference to the defective data site which is reassigned;

a corresponding reference to a reassignment data site; and making a vector cross-reference entry in the reassignment cross-reference table to cross-reference the second defective data site with the corresponding reassignment data site.

3. The method of claim 1, wherein the defect table includes both primary defects and grown defects.

4. The method of claim 2, wherein the reassignment data site is chosen from one or more spare data sites located on the disk.

5. The method of claim 4, wherein the one or more spare data sites are grouped into a contiguous pool of spare data sites.

6. The method of claim 5, wherein a single pool of spare data sites exists on each disk.

7. The method of claim 6, wherein a spare data site pointer points to the next available spare data site within the pool of spare data sites.

8. The method of claim 7, wherein the spare data site pointer is incremented to point to the next available spare data site upon reassignment of the second defective data site to a corresponding reassignment data site in the pool of spare data sites.

9. The method of claim 6, wherein the pool of spare data sites contains approximately 1000 spare data sites.

10. The method of claim 1, wherein both the skip type entry and the vector type entry share a common field format.

11. The method of claim 10, wherein each entry in the defect table comprises an entry type field and a location field.

12. The method of claim 11, wherein the location field of the defect table comprises an offset from an origin of a defect management partition.

13. The method of claim 1, wherein the method is implemented in firmware residing within a disk control system of the disk drive.

* * * * *